United States Patent

Dickinson, Jr.

[15] 3,665,009
[45] May 23, 1972

[54] 1-CARBAMOLYPYRAZOLE-4-SULFONAMIDES

[72] Inventor: Clifford Lee Dickinson, Jr., Wilmington, Del.

[73] Assignee: E. I. du Pont de Nemours and Company, Wilmington, Del.

[22] Filed: Aug. 18, 1969

[21] Appl. No.: 851,103

Related U.S. Application Data

[63] Continuation-in-part of Ser. No. 764,940, Oct. 3, 1968, abandoned.

[52] U.S. Cl. ............................. 260/310, 424/273
[51] Int. Cl. ........................................ C07d 49/02
[58] Field of Search .................................. 260/310

[56] References Cited

UNITED STATES PATENTS

| | | | |
|---|---|---|---|
| 3,274,203 | 9/1966 | Dickinson | 260/310 R |
| 3,277,100 | 10/1966 | Dickinson | 260/310 R |
| 3,534,058 | 10/1970 | Santilli | 260/310 R |

*Primary Examiner*—Alex Mazel
*Assistant Examiner*—James H. Turnipseed
*Attorney*—James H. Ryan

[57] ABSTRACT

Described are 1-carbamoylpyrazole-4-sulfonamides of the formula

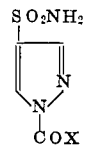

in which X is acyclic

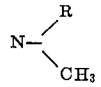

(R being alkyl, etc.), e.g., 1-(dimethylcarbamoly) pyrazole-4-sulfonamide. The compounds, prepared by direct interaction between pyrazole-4-sulfonamide and the appropriate carbamoyl chloride, are anti-inflammatory agents.

2 Claims, No Drawings

3,665,009

1-CARBAMOLYPYRAZOLE-4-SULFONAMIDES

RELATED APPLICATION

This application is a continuation-in-part of my copending application Ser. No. 764,940, filed Oct. 3, 1968, and now abandoned.

BACKGROUND OF THE INVENTION

1. Field of the Invention

This invention relates to, and has as its principal object provision of, novel 1-carbamoylpyrazole-4-sulfonamides which have anti-inflammatory properties. Another aspect of the invention comprises the treatment of inflammation with the compounds and pharmaceutical compositions useful for such treatment.

2. Description of the Prior Art

Bousquet U.S. Pat. No. 3,308,130 discloses N-disubstituted carbamoylpyrazoles, some of which have anti-inflammatory properties, but no sulfonamides. Bicking U.S. Pat. No. 3,097,210 shows substituted pyrazole-4-sulfonamides in which the 1-substituents are methyl, pyridyl or substituted phenyl. The Bicking compounds are used as diuretics.

SUMMARY AND DETAILS OF THE INVENTION

The compounds of the present invention have the formula

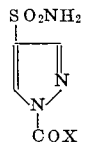

wherein X is: acyclic, i.e.,

where R is (straight- or branched-chain)

chain) alkyl or alkenyl of one to six carbon atoms or alkoxycarbonylalkyl of three to six carbon atoms.

In the above definitions, "lower" alkyl (and alkoxy) includes groups having from one to five carbon atoms.

Preferred compounds of this invention include 1-(dimethylcarbamoyl)pyrazole-4-sulfonamide.

All the compounds of the invention are readily made by direct interaction, e.g., under ambient conditions between pyrazole-4-sulfonamide and the appropriate carbamoyl chloride. An equation for this reaction can be written as:

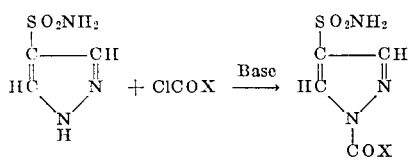

X being as above. Separation of the product is accomplished by obvious conventional techniques.

Pyrazole-4-sulfonamide can be prepared by the following reaction sequence (see Example 1, below):

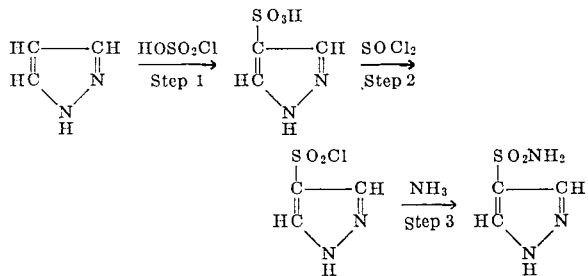

The carbamoyl chloride reactants are prepared by the reaction of the appropriate secondary amine with phosgene in the presence of triethylamine:

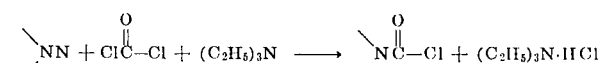

In practice, a solution of 1.0 to 10 equivalents of phosgene in an inert solvent (ether, tetrahydrofuran, benzene, hexane, ethyl acetate, etc.) is cooled to 0° to −10° C. To this is slowly added with stirring a solution of one equivalent of the appropriate secondary amine and one equivalent of triethylamine in the appropriate solvent. After two or more hours, the precipitate of triethylamine hydrochloride is filtered off and the solvent is boiled off from the filtrate. Liquid residues are purified by distillation; solids are recrystallized.

The reaction of compounds ClClCOX with pyrazole-4-sulfonamide and a base may be carried out in the presence of a solvent, e.g., ethers (diethyl, dibutyl, tetrahydrofuran), alcohols (methanol, ethanol, butanol), acetonitrile, dimethylformamide, esters (ethyl acetate), aromatic hydrocarbons (benzene, toluene), etc., at a temperature in the range 50° to 100° C. for times of 2 to 24 hours. The reaction is preferably conducted at the reflux temperature of the reaction mixture. In addition to sodium hydride, other strong bases such as sodium methylate, sodium hydroxide and trimethylamine may be used. The amounts of the reactants brought together may vary widely, but it is preferable to use a single molar quantity of each reactant employed.

The compounds of the present invention have biological activity as is shown in detail below.

EMBODIMENTS OF THE INVENTION

This invention is further illustrated by the following examples which are not, however, intended to fully delineate its scope. In these examples, percentages are by weight.

EXAMPLE 1

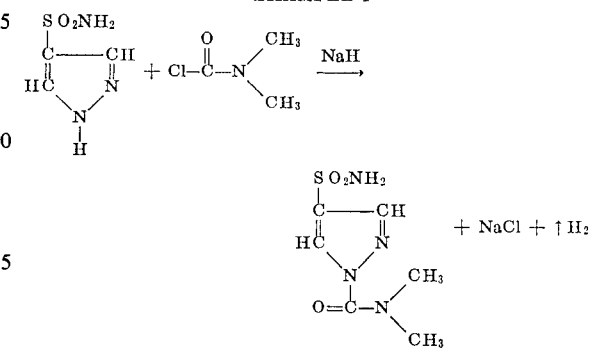

a. Pyrazole and a molar excess (preferably 2 moles/mole of pyrazole) of chlorosulfonic acid ($HOSO_2Cl$) are heated together at 100° C. for about 16 hours. Temperatures from 50° to 150° C. and times from 10 to 20 hours are suitable for this reaction.

b. Without isolation of the resulting pyrazole-4-sulfonic acid, the reaction mixture from (a) is treated at 50° to 100° C. with a molecular excess of thionyl chloride ($SOCl_2$) and pyrazole-4-sulfonyl chloride is precipitated by addition to an excess of ice. It is collected by filtration and dried.

c. Pyrazole-4-sulfonyl chloride (16.6 g., 0.1 mole) was added in portions with stirring to 100 ml. of anhydrous ammonia. The ammonia was allowed to evaporate and the residue was recrystallized from water: yield 9.7 g. (66 percent); m.p. 187° to 192° C. Recrystallization from dioxane raised the melting point of the pyrazole-4-sulfonamide product to 204° to 205° C.

Anal. Calcd. for $C_5H_5N_3SO_2$: C, 24.5; H, 3.4; S, 21.8

Found C, 25.1; H, 3.4; S, 21.8 d. Pyrazole-4-sulfonamide (1.47 g., 0.01 mole) was dissolved in 50 ml. of tetrahydrofuran, and 0.70 g. of sodium hydride in mineral oil (55 percent) and 1.20 g. of dimethylcarbamoyl chloride, prepared by the reaction of dimethyl amine with phosgene, were added. The mixture was stirred and refluxed overnight. The sodium chloride was filtered off, the tetrahydrofuran was boiled off the filtrate, and the residue was recrystallized from ethyl acetate several times to give pure 1-(dimethylcarbamoyl)pyrazole-4-sulfonamide melting at 150° to 151.5° C.

Anal. Calcd. for $C_6H_{10}N_4O_3S$: C, 33.0; H, 4.6; S, 14.7
Found C, 33.3; H, 4.5; S, 14.6

EXAMPLES 2–5

Use of the procedure of Example 1 to prepare other compounds within the scope of this invention is detailed in Table I which follows. In each case, substitution of the appropriate amine carbonyl chloride for the dimethyl carbamoyl chloride of Example 1 is employed. The amine carbonyl chlorides are made in the usual way by treating the appropriate amine, named in column 2, with phosgene in the presence of a base such as triethylamine. The final products of the examples were recrystallized from the following solvents; 10–12, from ethyl acetate; and Example 9, for benzene.

cent, acacia 5 percent and methylparaben 0.1 percent) at a volume of 1 ml. per 100 g. of body weight. Uniform hydration was provided by an additional volume of water equal to 2 ml. per 100 grams of body weight. The compound was administered at a dosage of 30, 100 and 300 mg./kg. of body weight to groups of six rats.

One hour after treatment with the compound, 0.05 ml. of 1 carrageenin solution was injected into the plantar region of the right hind paw of each rat. The volume of the foot was measured immediately after injection and again 3 hours later. The difference between the two volumes was the volume of induced edema. Foot volume was measured by immersion in mercury to an ink mark on the lateral malleolus. The mercury column was connected via a hydraulic system to a strain gauge. The output of the transducer was led to a Sanborn Transducer Amplifier, which was calibrated in terms of mercury displacement. The following results were obtained:

TABLE I

| Ex. | Amine | X | Yield, percent | M.p., °C. | Calcd. C | Calcd. H | Calcd. N | Found C | Found H | Found N |
|---|---|---|---|---|---|---|---|---|---|---|
| 2 | N-methyl-sec-butylamine | $-N(CH_3)-CHCH_2CH_3(CH_3)$ | 82 | 84–85 | 41.5 | 6.2 | 21.5 | 41.6 | 6.2 | 21.5 |
| 3 | N-methyl(2-ethoxy-carbonyl-1-methyl-ethyl)amine | $-N(CH_3)-C(CH_3)-CH_2C(O)-OC_2H_5$ | 15 | 108–111 | 41.5 | 5.7 | 17.6 | 41.2 | 5.6 | 17.4 |
| 4 | N-methylethylamine | $-N(CH_3)-CH_2-CH_3$ | 56 | 137–138 | 36.2 | 5.2 | 24.1 | 36.3 | 5.1 | 24.3 |
| 5 | N-methylallylamine | $-N(CH_3)-CH_2-CH=CH_2$ | 70 | 107–108 | 39.4 | 4.9 | 23.0 | 38.8 | 5.1 | 22 |

EXAMPLE 6

To a 12-liter reaction flask was charged 1,800 g. of pyrazole-4-sulfonamide, 990 g. of dimethylcarbamoyl chloride and 2500 ml. of methanol. The resulting slurry was stirred while 1940 g. of 25 percent sodium methoxide was fed in during one hour. An additional 990 g. of dimethylcarbamoyl chloride was then added all at once followed by the addition of a second 1,940-g. portion of 25 percent sodium methoxide over another hour. The temperature was maintained at 15° to 30° C. during these additions. The reaction mass was left to stir overnight at ambient temperature.

The reaction mass was concentrated by distillation until the residue temperature reached 93° C. Water (7 liters) was added and the resulting solution heated to 95° C. and filtered hot. The filtrate was left to cool overnight. The precipitated product was then collected by filtration, washed with distilled water (3 × 1,000 ml.), and dried overnight at 100° C. in a vacuum oven. This procedure yielded 2,242 g. (83.7 percent yield) of 1-(dimethylcarbamoyl)pyrazole-4-sulfonamide, m.p. 149° to 152° C. The neutral equivalent (nonaqueous) was 219.

UTILITY

The compounds of the present invention are useful as anti-inflammatory agents as is shown by the inhibition of U. V. erythema in guinea pigs, by the inhibition of phenylquinone-induced stretching in mice and by the inhibition of carrageenin-induced edema in the rat paw. This biological utility is illustrated in the lettered examples which follow:

EXAMPLES A–E

The compounds were tested in the inhibition of carrageenin-induced edema in the rat paw in the manner of C. A. Winter, E. A. Risley, and G. A. Nuss, Proc. Soc. Exp. Biol. and Med. 111, 544 (1962).

Each compound was administered to 100-g., Carworth Farms CFE rats by intubation of a solution of the compound in polyvinyl alcohol-acacia medium (polyvinyl alcohol 1 per- TABLE II
[Inhibition of carrageenin-induced edema]

| Ex. | Compound tested (-pyrazole-4-sulfonamide) | Percent inhibition of carrageenin-induced edema, oral dosage 30 mg./kg. | 100 mg./kg. | 300 mg./kg. |
|---|---|---|---|---|
| A | 1-(dimethylcarbamoyl) | 16 | 61 | |
| B | 1-(N-methyl-N-sec-butyl-carbamoyl) | 16 | 27 | 35 |
| C | 1-[N-methyl-N-(2-ethoxycarbonyl-1-methylethyl)carbamoyl] | 30 | 7 | 33 |
| D | 1-(N-ethyl-N-methylcarbamoyl) | 20 | 32 | 76 |
| E | 1-(N-allyl-N-methylcarbamoyl) | 3 | 39 | |

In the lettered examples above, the compounds of this invention were administered orally, i.e., by intubation. In normal pharmaceutical practice, oral administration will also be used, but parenteral injection or rectal administration by suppository can be used. Dosage will vary and will depend on such obvious factors as the condition being treated; age and eight of the recipient; the responsiveness of the recipient; prior, concurrent and intended subsequent medication and treatment, general health of the recipient; frequency of treatment; and, of course, the purpose and nature of the effect desired.

Generally speaking, the active compound will be administered to a warm-blooded animal in a physiologically beneficial amount. Administration can be in a single dose or in a plurality of doses over an extended period of time. It will furthermore be understood that every compound within this invention does not have an identical level of dosage requirement for therapeutic or prophylactic effectiveness and therefore experts will understand that some dosage variation between compounds can be expected for maximum benefits. It will, of course, also be understood that an initial dose, or first group dose, in a course of treatment can be in greater amounts, if appropriate for a particular medical situation and a rapid response is sought by the early administration of relatively large doses and thereafter the minimally effective dosage, or maintenance dosage is determined. Dosage will usually be within the range of 7 to 7,000 mg. a day. Frequently the dosage will be from 14 to 3,500 mg. a day, and most usually within the range of 35 to 1,750 mg. a day.

For treating small animals with high physiological response with highly active compounds, routine usage can be at much lower dosage levels. Doses can be repeated in the same or greater or lesser amounts over a period of time as long as improvement in the recipient is observed or as long as needed under the circumstances.

The active compound will ordinarily be administered with a nontoxic pharmaceutical carrier in a variety of practical dosage forms. These dosage forms are novel compositions comprising the nontoxic pharmaceutical carrier and a physiologically beneficial amount of one or more active compounds of this invention. These highly useful dosage forms constitute an important aspect of the present invention.

Suitable nontoxic pharmaceutical carriers or vehicles include liquids such as water, aromatic water, alcohols, syrups, elixirs, pharmaceutical mucilages such as acacia and tragacanth, oils such as petroleum, animal, vegetable or synthetic origin, for example, peanut oil, soybean oil, fish oil such as cod liver oil, or the like, for oral administration; water, saline, aqueous lactose, aqueous maltose, aqueous glucose (dextrose), aqueous sucrose, or the like, for administration by injection. Suitable solid carriers include soft gelatin capsules, hard gelatin capsules, slow or delayed release pills or capsules, powders, tableting vehicles and the like. Suitable solid or liquid nontoxic pharmaceutical carriers are well known in the art and the selection of carrier can be from those appropriate and available in accordance with well known prescription techniques. The compositions of this invention therefore include such dosage forms as solution, suspensions, syrups, elixirs, tablets, capsules, powder packets, and the like.

A vast number of suitable pharmaceutical carriers are described in "Remington's Pharmaceutical Sciences" edited E. W. Martin, 13th edition, published by the Mack Publishing Company, Easton, Pennsylvania, 1965.

In these novel compositions, the active ingredient will generally be present in an amount of between 0.1 to 50 percent by weight based on the total weight of the composition for oral administration. In the liquid carrier, the active compounds of the present invention will generally be present in an amount of between 0.1 to 10 percent by weight of the total composition. When a solid carrier is employed, the compounds of the present invention which form the active ingredient will generally be present in amounts of from 5 to 50 percent by weight.

The amount of pharmaceutical carrier in the novel compounds are generally in the range of from 5 to 99 percent by weight and preferably from 50 to 99 percent by weight.

The compositions can, of course, contain suitable pharmaceutical modifiers such as coloring agents, sweetening or other flavoring agents, solubilizing agents, etc., as will readily occur to persons skilled in this art.

A large number of unit capsules are prepared for oral administration by filling standard two-piece hard gelatin capsules with a mixture consisting of 250 mg. of the composition of the present invention, 180 mg. of anhydrous lactose, 16 mg. of talc and 4 mg. of magnesium stearate. A large number of soft gel capsules can be prepared for oral administration by filling with a suspension of 100 mg. of a compound of the present invention, 130 mg. of soybean oil, 2 mg. of hydrogenated soybean oil, 2 mg. of beeswax, 8 mg. of vegetable shortening and 4 mg. of soy lecithin.

A large number of tablets can be prepared using standard tableting procedures so that each tablet contains 50 mg. of the compound of the present invention, 8 mg. of gelatin, 6 mg. of magnesium stearate, 150 mg. of mannitol and 20 mg. of cornstarch. The tablets so formed may be coated to mask the taste, to improve appearance, or to affect the release rate of the material.

As a specific illustration: the compound 1-(di-methylcarbamoyl)pyrazole-4-sulfonamide, which has anti-inflammatory activity, can be formulated in an injectable solution of 0.5 and 1 percent by weight concentration in isotonic saline; as an injectable solution in 0.5 and 1 percent by weight concentration in aqueous sugars including in separate solutions lactose, maltose, glucose (dextrose) and sucrose; in water in 0.1, 0.5 and 1 percent by weight concentration for oral administration, with and without a flavoring agent, a coloring agent, an antitussive agent, etc.; and in 25, 50 and 100 mg. in standard two-piece sealed hard gelatin capsules, as well as in soft gelatin capsules. It can also be formulated with suitable tableting adjuvants using a conventional tableting machine with the active ingredient constituting about 5–55 percent by weight of the tablet. Other ingredients include gelatin, magnesium stearate and starch. The tablets may be sugar-coated. Individual doses may be in the range of 25 to 250 mg. per dose.

Since obvious modifications and equivalents in the invention will be evident to those skilled in the chemical arts, I propose to be bound solely by the appended claims.

The embodiment of the invention in which an exclusive property or privilege is claimed are defined as follows:

1. A compound having the formula

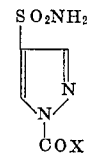

wherein X is:

R being alkyl or alkenyl of 1 to 6 carbon atoms or alkoxycarbonylalkyl of three to six carbon atoms.

2. The compound of claim 1 in which X is N,N-dimethylamino: 1-(dimethylcarbamoyl)pyrazole-4-sulfonamide.

* * * * *